June 26, 1923.
W. DOBSCHUTZ
1,460,316
COMBINED RUNNING BOARD MAT AND LIGHT
Filed Jan. 10, 1922
2 Sheets-Sheet 1
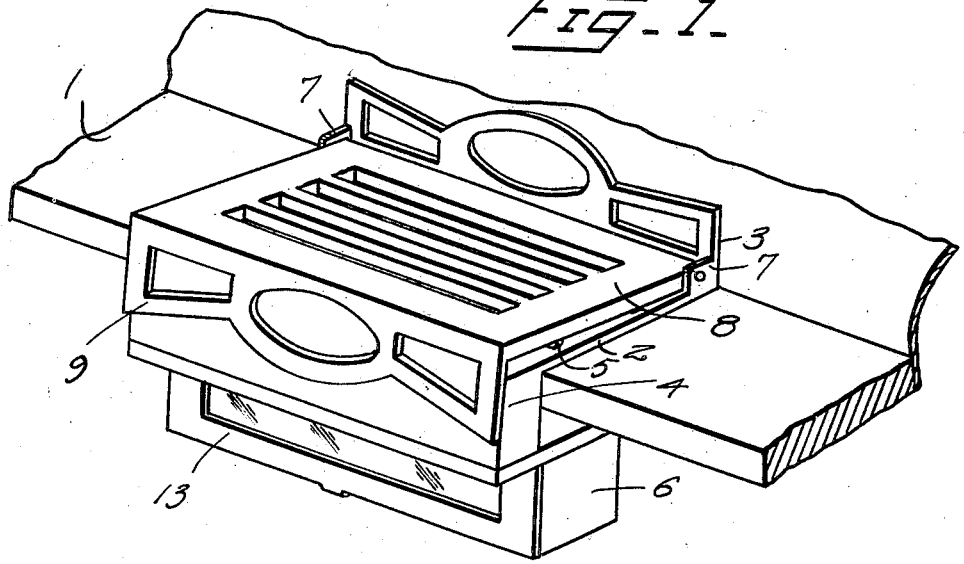
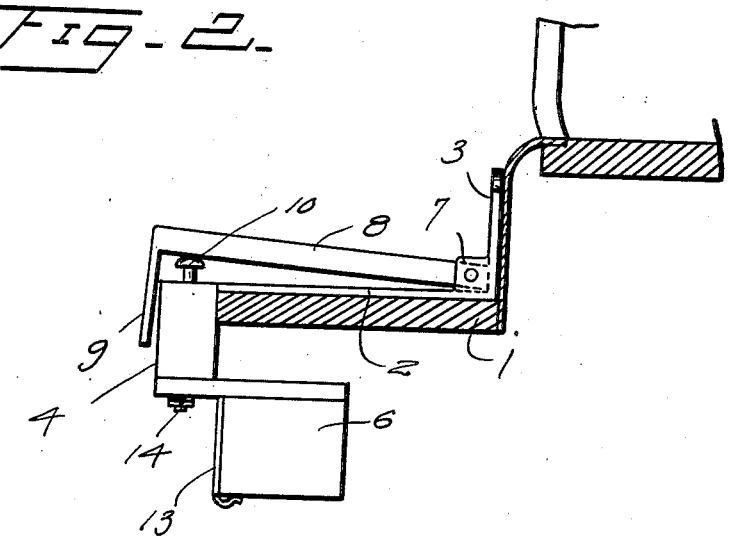
Inventor
W. Dobschutz June 26, 1923.
W. DOBSCHUTZ
1,460,316
COMBINED RUNNING BOARD MAT AND LIGHT
Filed Jan. 10, 1922    2 Sheets-Sheet 2
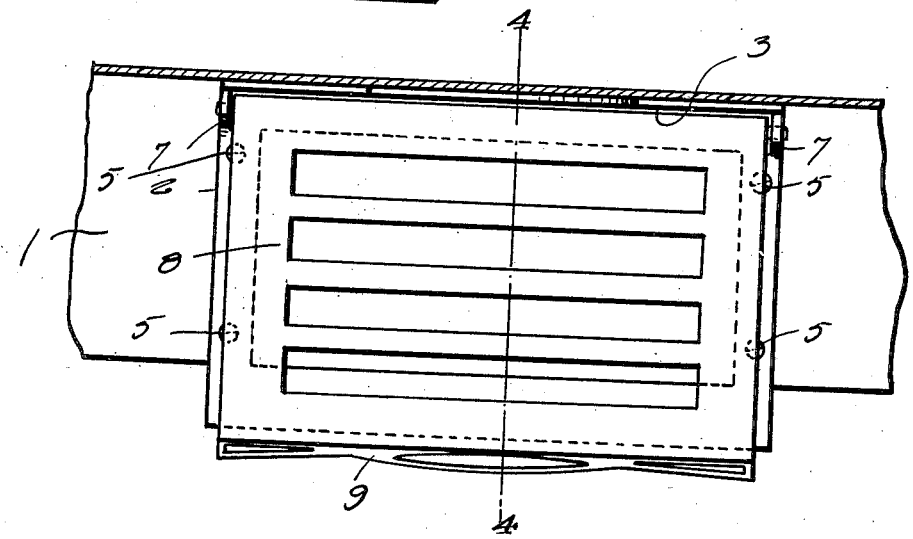
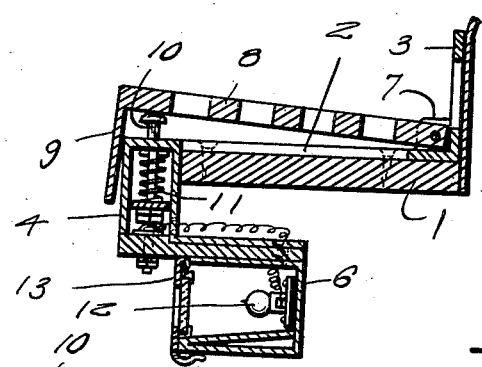
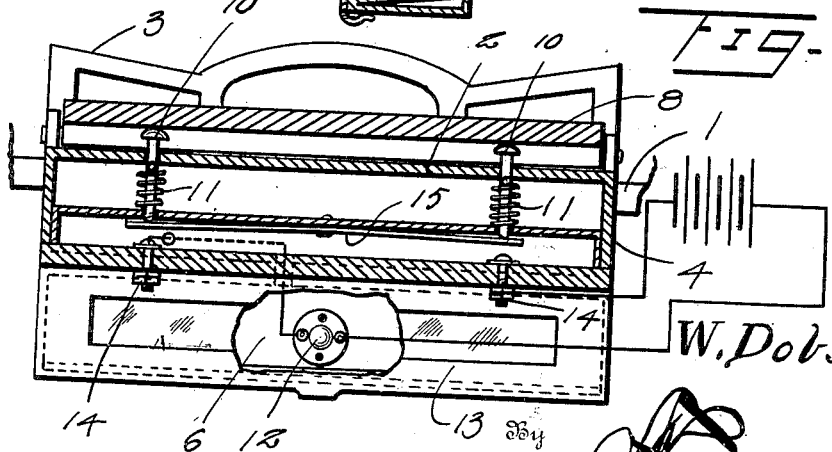
Inventor
W. Dobschutz Patented June 26, 1923.

1,460,316

UNITED STATES PATENT OFFICE.

WALTER DOBSCHUTZ, OF ST. LOUIS, MISSOURI.

COMBINED RUNNING-BOARD MAT AND LIGHT.

Application filed January 10, 1922. Serial No. 528,266.

*To all whom it may concern:*

Be it known that I, WALTER DOBSCHUTZ, a citizen of the United States, residing at St. Louis, State of Missouri, have invented certain new and useful Improvements in Combined Running-Board Mats and Lights; and I do hereby declare the following to be a full, clear, and exact description of the invention, such as will enable others skilled in the art to which it appertains to make and use the same.

The invention provides an appliance for the running boards of automobiles and other vehicles, whereby a person may alight safely after dark, since the act of stepping upon the running board or like part closes an electric circuit whereby rays of light are shed upon the curb, pavement or like place so that the person may make a safe landing, the circuit being automatically broken the instant the running board or like part is relieved of the weight of the person alighting from the automobile or like vehicle. The invention furthermore provides a mat whereby mud and other foreign matter clinging to the feet may be removed preliminary to entering the automobile or other vehicle, whereby to prevent the soiling of the floor covering thereof.

Other objects and advantages will be apparent and suggest themselves as the nature of the invention is understood.

Referring to the accompanying drawings forming a part of the application,

Figure 1 is a detail view in perspective, showing the invention applied to the running board of an automobile or analogous vehicle, Figure 2 is a side view thereof, the running board being in section, Figure 3 is a top plan view of the device, parts being broken away, Figure 4 is a section on the line 4—4 of Figure 3, showing the circuit for the electric lamp, and Figure 5 is a front view, partly in section.

Corresponding and like parts are referred to in the following description and designated in the several views of the drawings by like reference characters.

The device comprises a frame which is adapted to be secured to the running board 1 of an automobile or other vehicle. This frame comprises a base portion 2, a back 3, and a depending front portion 4. The base 2 is open and is adapted to be secured to the running board 1 by means of screws, bolts or like fastenings 5. The back 3 extends upwardly to protect the apron or the body of the vehicle, according to the relative position of the running board. The depending front portion 4 extends downwardly in front of the running board 1 and contains the circuit closing means and supports a box 6 which is disposed beneath the running board 1 adjacent the outer edge thereof. Ears 7 are provided at opposite ends of the angle formed between the base 2 and back 3, and a member 8 is pivoted at its inner end thereto. The member 8 is in the form of a grid and constitutes a mat upon which the person steps when entering or leaving the automobile or other vehicle. The member 8 has a depending front portion 9 extending downwardly in front of the depending portion 4 of the frame. The outer or front portion of the member 8 is normally held elevated and is depressed when stepped upon. Push buttons 10, mounted in the depending portion 4, normally support the outer or front portion of the member 8 in elevated position. A spring 11 cooperates with each of the push buttons 10 to normally hold the same elevated.

The box 6 may be of any construction and contains an electric light 12. The front of the box 6 is closed by means of a hinged cover 13 which is preferably of glass or other transparent material to admit of the ready passage of the rays of light therethrough. The back of the box 6 constitutes a reflector which, in conjunction with the position of the electric bulb 12, sheds the rays of light upon the curb, pavement or like place adjacent and in front of the running board 1 so that the person alighting after dark may observe the landing which may be safely made without stepping into mud, water or a depression, or upon any obstruction.

The electric lamp 12 is included in a circuit which derives current from a suitable source of supply on the automobile or vehicle, said circuit including a switch which is closed when pressure is imposed upon the member 8. The switch or circuit closer comprises one or more fixed contacts 14 and a spring 15, one for each of the contacts 14. A push button 10 is associated with each element 15 of the circuit closer, whereby to depress the elements 15 when the member 8 is stepped or otherwise pressed upon.

When the device is in position, a person stepping upon the member 8 depresses the same and closes the circuit through the electric bulb 12, whereby the roadway adjacent the running board 1 of the automobile or other vehicle is lighted, thereby enabling a safe landing after dark. The open or grid formation of the member 8 results in the provision of a mat which may be utilized for cleaning the feet preliminary to entering the automobile or other vehicle, whereby to prevent soiling the floor covering.

What is claimed is:

1. A combined mat and light for the running board of an automobile, the same comprising a frame adapted to be secured to the running board, an electric light carried by the frame and included in a circuit containing closing means therefor, and a foot cleaning member mounted upon the frame and adapted to be depressed by weight imposed thereon and when depressed to effect a closing of the circuit of said electric light, whereby to shed rays to insure a safe landing.

2. A combined foot cleaner and light for the running board of a vehicle, the same comprising a frame adapted to be secured to the running board, an electric light carried by the frame and disposed beneath the running board to be protected thereby and included in a circuit containing closing means, and a foot cleaning member mounted upon the frame and adapted to be depressed and effect a closing of the circuit including the lamp, whereby the rays of light are shed to insure a safe landing.

3. A device of the character specified comprising a frame adapted to be attached to the upper side of the running board of a vehicle, means on said frame supporting an electric lamp disposed beneath the running board to be out of the way and protected thereby, and a member mounted upon the frame and depressible by pressure exerted thereon, whereby to effect a closing of a circuit to said lamp.

4. A device of the character specified comprising a frame including a base and a depending front portion and adapted to be secured to the running board of a vehicle with the depending portion disposed in front of the running board, a box connected to the depending portion of the frame and disposed beneath the running board, an electric lamp within said box and included in a circuit containing closing means, and a depressible member mounted upon the frame and adapted when pressed upon to effect a closing of the lamp circuit.

5. A device of the character specified comprising a frame embodying an open base and a front depending portion, a circuit closer mounted in said depending portion, a box attached to said depending portion and disposed beneath the frame, an electric lamp within said box, a light circuit, said lamp and circuit closer being in said light circuit, and a grid member mounted upon the frame and depressible for actuating said circuit closer.

6. A device of the character specified comprising a frame including an open base, an upwardly extending back at the rear end of the base, and a depending portion at the front end of the base, an electric lamp having connection with the depending portion of the frame and included in a circuit containing closing means, and a grid member pivoted to the frame and adapted when depressed to close the lamp circuit.

7. A combined mat and light for the running board of a vehicle, the same comprising a frame including an open base, a back at the rear end of the base, and a depending portion at the front end of the base, a box attached to the depending portion of the frame and disposed beneath the base portion thereof, an electric lamp within said box included in a circuit containing circuit closing means mounted upon the depending portion of the frame, and a grid member disposed above the open base portion of the frame and having pivotal connection with the rear end of the latter and having a forward depending portion to enclose the depending portion of the frame, said member when pressed upon operating to close the lamp circuit.

8. A device of the class described comprising a frame including a base having an upstanding back and a depending front portion, said base adapted to be secured to the running board of a vehicle with the back in position to protect the apron of the vehicle and with the depending portion disposed in front of the running board, a lamp box connected to the depending portion of the frame and disposed beneath the running board of the vehicle, an electric lamp within said lamp box and included in a circuit containing closing means, and a depressible member mounted upon the same and adapted when depressed to effect a closing of the lamp circuit.

In testimony whereof I affix my signature in presence of two witnesses.

WALTER DOBSCHUTZ.

Witnesses:
 ALBERT H. MEYER,
 GEO. MERTINS.